(12) United States Patent
Madakashira

(10) Patent No.: US 11,797,930 B2
(45) Date of Patent: Oct. 24, 2023

(54) SYSTEM AND METHOD FOR SECURING DATA THROUGH PROCTORED WORKING ENVIRONMENT

(71) Applicant: Virtusa Corporation, Southborough, MA (US)

(72) Inventor: Giridhara Padmanabha Rao Madakashira, Bangalore (IN)

(73) Assignee: Virtusa Corporation, Southborough, MA (US)

( * ) Notice: Subject to any disclaimer, the term of this patent is extended or adjusted under 35 U.S.C. 154(b) by 404 days.

(21) Appl. No.: 17/107,775

(22) Filed: Nov. 30, 2020

(65) Prior Publication Data

US 2021/0406396 A1  Dec. 30, 2021

(30) Foreign Application Priority Data

Jun. 25, 2020 (IN) .............................. 202041026911

(51) Int. Cl.
*G06Q 10/10* (2023.01)
*G06F 21/62* (2013.01)
(Continued)

(52) U.S. Cl.
CPC ......... *G06Q 10/10* (2013.01); *G06F 16/2379* (2019.01); *G06F 21/6245* (2013.01);
(Continued)

(58) Field of Classification Search
CPC ................ G06Q 10/10; G06Q 30/0185; G06F 16/2379; G06F 21/6245; G06F 18/214;
(Continued)

(56) References Cited

U.S. PATENT DOCUMENTS 9,378,648 B2 6/2016 Logan et al.
2004/0015926 A1* 1/2004 Antonov ............. H04L 63/0428
717/155

(Continued)

FOREIGN PATENT DOCUMENTS

WO 2011001250 A1 1/2011
WO 2018173645 A1 9/2018

OTHER PUBLICATIONS

NPL Search Terms (Year: 2023).*

*Primary Examiner* — Syed A Zaidi
(74) *Attorney, Agent, or Firm* — Danielson Legal LLC

(57) ABSTRACT

A system for securing data is disclosed. The system includes a processing subsystem including a connection module to evaluate a computing device corresponding to remote workers for compatibility with a peripheral edge computing device, the computing device is enabled with an edge assisted proctoring service. The system includes an edge computing subsystem including an authentication module to verify an identity of the remote workers on the computing device using verification processes. The edge computing subsystem includes an activity monitoring module to monitor activities of the remote workers by collecting streaming data in real-time on the peripheral edge computing device. The activity monitoring module identifies suspicious activities by processing the streaming data. The edge computing subsystem includes an alert generation module to generate an alert upon identifying the suspicious activities. The edge computing subsystem includes a logging module to record the suspicious activities and store it in the server using Blockchain.

10 Claims, 4 Drawing Sheets

(51) Int. Cl.

| | | |
|---|---|---|
| *H04L 9/40* | (2022.01) | |
| *G06F 16/23* | (2019.01) | |
| *G06N 20/00* | (2019.01) | |
| *G06Q 30/018* | (2023.01) | |
| *H04L 41/069* | (2022.01) | |
| *G06V 40/16* | (2022.01) | |
| *H04L 65/75* | (2022.01) | |
| *G06V 20/64* | (2022.01) | |
| *G06V 40/10* | (2022.01) | |
| *G06V 40/20* | (2022.01) | |
| *G06F 18/214* | (2023.01) | |

(52) U.S. Cl.
CPC ......... *G06N 20/00* (2019.01); *G06Q 30/0185* (2013.01); *G06V 40/172* (2022.01); *H04L 41/069* (2013.01); *H04L 63/083* (2013.01); *H04L 63/0853* (2013.01); *H04L 63/0861* (2013.01); *H04L 63/1425* (2013.01); *H04L 65/762* (2022.05); *G06F 18/214* (2023.01); *G06F 2221/2101* (2013.01); *G06V 20/64* (2022.01); *G06V 40/10* (2022.01); *G06V 40/15* (2022.01); *G06V 40/20* (2022.01)

(58) Field of Classification Search
CPC ........... G06F 2221/2101; H04L 65/762; H04L 41/069; H04L 63/083; H04L 63/1425; H04L 63/0853; H04L 63/0861; G06V 40/10; G06V 40/20; G06V 40/15; G06V 40/172; G06N 20/00
See application file for complete search history.

(56) References Cited

U.S. PATENT DOCUMENTS

| | | | |
|---|---|---|---|
| 2007/0117083 A1* | 5/2007 | Winneg | G09B 7/00 434/350 |
| 2011/0207108 A1* | 8/2011 | Dorman | G09B 9/00 434/350 |
| 2011/0223576 A1* | 9/2011 | Foster | G09B 7/02 434/362 |
| 2011/0321165 A1* | 12/2011 | Capalik | G06F 11/3471 726/25 |
| 2012/0042358 A1 | 2/2012 | Kondur | |
| 2012/0309379 A1* | 12/2012 | Bennett | H04M 11/04 455/419 |
| 2015/0037781 A1 | 2/2015 | Breed et al. | |

* cited by examiner

SYSTEM AND METHOD FOR SECURING DATA THROUGH PROCTORED WORKING ENVIRONMENT

BACKGROUND

Embodiments of the present disclosure relate to security systems and more particularly to a system and a method for securing data through proctored working environment.

Rapid evolution of technology and mass adoption of cheap devices, such as tablets and electronic readers with high definition displays, digital cameras, 3D printers, 3D scanners and the widespread availability of internet services have introduced challenges to businesses and individuals to protect, preserve, and enhance their intellectual property and intellectual assets. In a highly regulated industries like financial and healthcare BPO service companies, data privacy and cybersecurity is paramount important. Such industries tend to keep employment in-house to monitor and ensure the security of their data. However, the recent trend in distributed workforce and remote working are gaining popularity among enterprises. The enterprises are opting for various digital solutions that may help sustain such remote working trends, which tend to offer greater benefits in terms of cost efficiencies and increased productivity. Therefore, it is critical for industries to find reliable and resilient solutions that may make the remote working scenario secured, friction-less and result driven.

With advancement in technology, there are solutions around online remote proctoring based on computer visioning, which ensures clean desk and address integrity issues for strict compliance adherence. However, many of existing solutions are cloud-centric, where the data (video stream) to be centrally processed and red flags any suspicious activities through annotations. The cloud-based solution demands higher network bandwidth, relies on high-speed, highly available network connections and lot of storage for archiving.

Hence, there is a need for an improved system for securing data and prevent data breach in an efficient manner to address the aforementioned issue(s).

BRIEF DESCRIPTION

In accordance with an embodiment of the present disclosure, a system for securing data through proctored working environment is provided. The system includes a processing subsystem hosted on a server. The processing subsystem includes a connection module configured to evaluate a computing device corresponding to one or more remote workers for compatibility with a peripheral edge computing device, where the computing device is enabled with an edge assisted proctoring service communicatively coupled to the peripheral edge computing device. The system also includes an edge computing subsystem hosted on the peripheral edge computing device. The edge computing subsystem includes an authentication module configured to verify an identity of the one or more remote workers on the computing device evaluated by the connection module using a plurality of verification processes. The edge computing subsystem also includes an activity monitoring module configured to monitor a plurality of activities of the one or more remote workers verified by the authentication module by collecting streaming data in real-time on the peripheral edge computing device. The activity monitoring module is also configured to identify one or more suspicious activities from the plurality of activities by processing the streaming data collected on the peripheral edge computing device using one or more image processing techniques. The edge computing subsystem includes an alert generation module configured to generate an alert to the processing subsystem upon identifying the one or more suspicious activities by the activity monitoring module. The edge computing subsystem further includes a logging module configured to record the one or more suspicious activities and store one or more recorded suspicious activities in the server using Blockchain for audit and traceability purpose. The processing subsystem further includes an access control module configured to mask sensitive information corresponding to the one or more suspicious activities displayed on the computing device upon receiving the alert generated by the alert generation module.

In accordance with another embodiment of the present disclosure, a method for securing data through proctored working environment is provided. The method includes evaluating, by a connection module, a computing device corresponding to one or more remote workers for compatibility with a peripheral edge computing device, wherein the computing device is enabled with an edge assisted proctoring service communicatively coupled to the peripheral edge computing device. The method also includes verifying, by an authentication module, an identity of the one or more remote workers on the computing device evaluated by the connection module using a plurality of verification processes. The method further includes monitoring, by an activity monitoring module, a plurality of activities of the one or more remote workers verified by the authentication module by collecting streaming data in real-time on the peripheral edge computing device. The method further includes identifying, by the activity monitoring module, one or more suspicious activities from the plurality of activities by processing the streaming data collected on the peripheral edge computing device using one or more image processing techniques. The method further includes generating, by an alert generation module, an alert to the processing subsystem upon identifying the one or more suspicious activities by the activity monitoring module. The method further includes recording, by a logging module, the one or more suspicious activities and storing one or more recorded suspicious activities in the server using blockchain for audit and traceability purpose. The method further includes masking, by the access control module, sensitive information corresponding to the one or more suspicious activities displayed on the computing device upon receiving the alert generated by the alert generation module.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
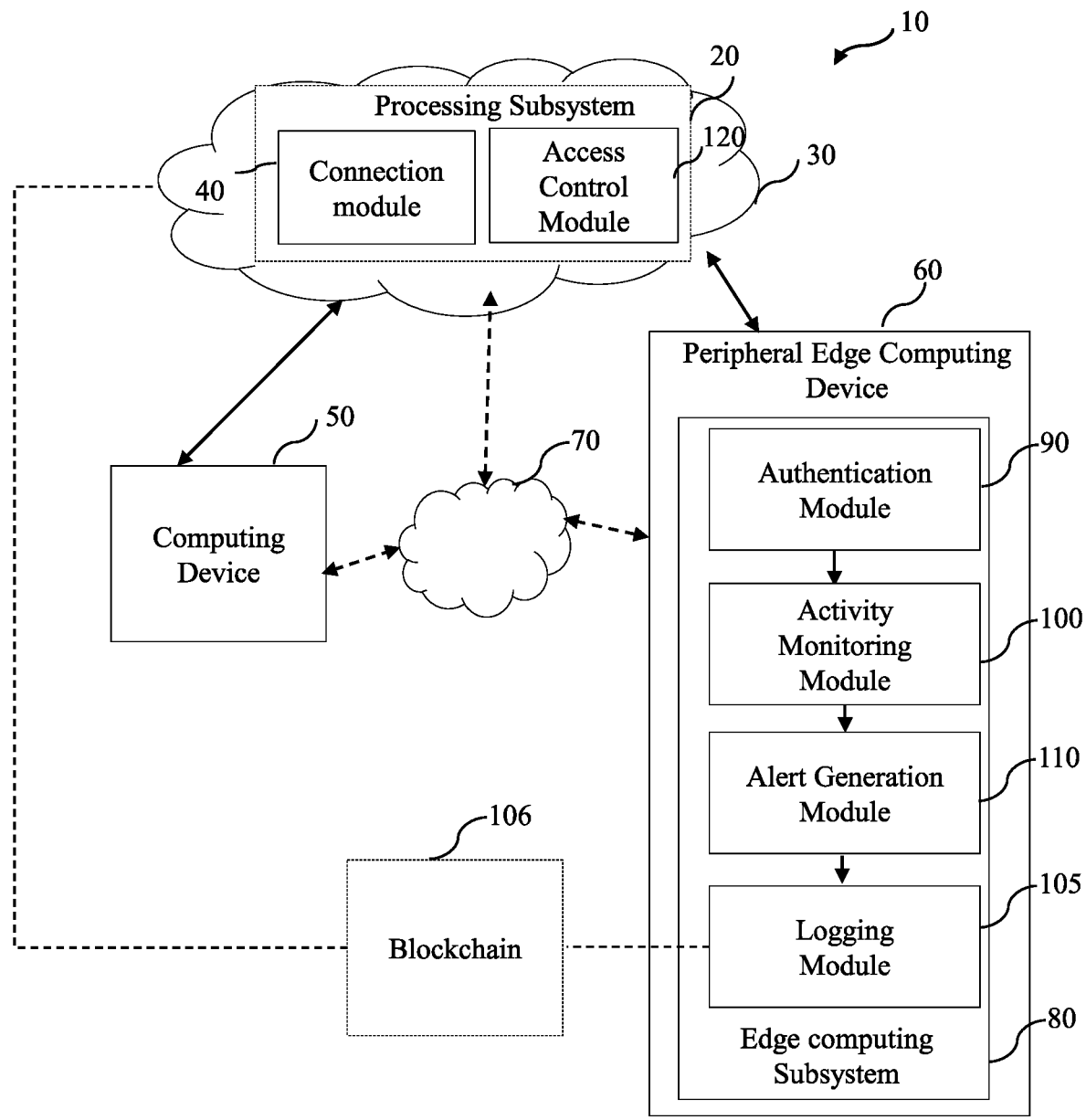
FIG. 1 is a block diagram representation of a system for securing data through proctored working environment in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for securing data through a proctored working environment. The system includes a processing subsystem hosted on a server. The processing subsystem includes a connection module configured to evaluate a computing device corresponding to one or more remote workers for compatibility with a peripheral edge computing device, where the computing device is enabled with an edge assisted proctoring service communicatively coupled to the peripheral edge computing device. The system also includes an edge computing subsystem hosted on the peripheral edge computing device. The edge computing subsystem includes an authentication module configured to verify an identity of the one or more remote workers on the computing device evaluated by the connection module using a plurality of verification processes. The edge computing subsystem also includes an activity monitoring module configured to monitor a plurality of activities of the one or more remote workers verified by the authentication module by collecting streaming data in real-time on the peripheral edge computing device. The activity monitoring module is also configured to identify one or more suspicious activities from the plurality of activities by processing the streaming data collected on the peripheral edge computing device using one or more image processing techniques. The edge computing subsystem further includes an alert generation module configured to generate an alert to the processing subsystem upon identifying the one or more suspicious activities by the activity monitoring module. The edge computing subsystem further includes a logging module configured to record the one or more suspicious activities and store one or more recorded suspicious activities in the server using Blockchain for audit and traceability purpose. The processing subsystem further includes an access control module configured to mask sensitive information corresponding to the one or more suspicious activities displayed on the computing device upon receiving the alert generated by the alert generation module.

FIG. 1 is block diagram representation of a system (10) for securing data through a proctored working environment in accordance with an embodiment of the present disclosure. The system (10) includes a processing subsystem (20) hosted on a server (30). In one embodiment, the server (30) may be a cloud server. The processing subsystem (20) includes a connection module (40) which evaluates a computing device (50) corresponding to the one or more remote workers for compatibility with a peripheral edge computing device (60). In one embodiment, the processing subsystem (20) of the server (30) is communicatively coupled to the computing device (50) of the corresponding one or more remote workers and the peripheral edge computing device (60) via a communication network (70). In such an embodiment, the communication network (70) may include, but not limited to, wi-fi, Bluetooth, Zigbee, LAN, or the like. As used herein, "remote worker" is a person working outside the premises of any organisation. The computing device (50) is enabled with an edge assisted proctoring service communicatively coupled to the peripheral edge computing device (60). As used herein, "proctoring service" is a service which monitors computing device, webcam video and audio. The data recorded by the proctoring service is transferred for review of the proctored data". In one embodiment, the computing device (50) may include, but not limited to, a computer, a laptop, a tablet, a mobile or the like.

Furthermore, the system (10) includes an edge computing subsystem (80) hosted on the peripheral edge computing device (60). In some embodiments, peripheral edge computing device (60) may include, but not limited to, a computer, a laptop, a tablet, a mobile or the like. As used herein, "edge computing optimizes internet devices and web applications by bringing computing closer to the source of the data". The edge computing subsystem (80) includes an authentication module (90) which verifies an identify of the one or more remote workers on the computing device (50) evaluated by the connection module (40) using multiple verification processes. In one embodiment, the multiple verification processes may include, but not limited to, at least one of a password authentication process, a face authentication process, an authorized ID authentication process, a voice authentication process, a biometric data authentication process or a combination thereof.

In an exemplary embodiment, the authentication module (90) may authenticate the identity of the one or more remote worker using a one-time-password process. The authentication module (90) may generate a one-time-password for the remote worker registered with an organisation and authenticate the identity by receiving the login using the generated one-time-password. In another exemplary embodiment, the authentication module (90) verifies the identity of the one or more remote workers using a real time 3D face identification process. The image of the remote worker's face is captured using an image capturing device and further analysed using image processing techniques. The analysed image is then compared with an image present in the record database of the organisation to authenticate the remote worker. In yet another exemplary embodiment, the authentication module (90) verifies the identity of the one or more remote workers using the authorized ID authentication process, where the remote worker may display the government authorized ID proof in front of the image capturing device. The image capturing device captures the image of the ID proof and matches with the record database to authenticate the remote worker.

In yet another embodiment, the authentication module (90) verifies the identity of the one or more remote workers using the voice authentication process, where the voice of the remote work may be used as the password to authenticate the identity of the remote worker. The authentication module (90) matches the voice of the remote worker with the prestored voice to authenticate each time. In yet another embodiment, the biometric data such as fingerprints, iris or the like may be used to authenticate the identity of the remote worker. In such an embodiment, the biometric data authentication process may include obtaining one or more physiological parameters using a wearable device coupled to the one or more remote workers.

The edge computing subsystem (80) also includes an activity monitoring module (100) to monitor various activities of the one or more remote workers verified by the authentication module (90) by collecting streaming data in real-time on the peripheral edge computing device (60). In one embodiment, the activity monitoring module (100) may collect the streaming data in real-time on the peripheral edge computing device (60) using at least one visual media present on the computing device (50). In such an embodiment, the streaming data may include the data proctored by the edge assisted proctoring service and the data streamed using the visual media of the computing device (50). Further, the activity monitoring module (100) identifies one or more suspicious activities from the various activities by processing the streaming data collected on the peripheral edge computing device (60) using one or more image processing techniques. In a specific embodiment, the one or more suspicious activities may include, but not limited to, at least one of a multiple of faces of non-workers on a screen of the computing device, presence of any data capturing device appeared in the surroundings of the remote workers, absence of the one or more remote workers from the screen, eye movements (frequently looking away from screen), taking screenshots, keeping a note of data streaming on the screen or a combination thereof.

The edge computing subsystem further includes a logging module (105) configured to record the one or more suspicious activities and store one or more recorded suspicious activities in the server using Blockchain (106) for audit and traceability purpose. The log of the data may be stored in a cloud database using Blockchain and used to track the activities of the remote workers which may be used to take any action against the suspicious activity performed by the remote worker. In such an embodiment, the activity monitoring module (100) may generate an incident report based on the log of the streaming data when the one or more suspicious activities are identified. In a specific embodiment, the activity monitoring module (100) may receive the physiological parameters obtained by the wearable device of the remote workers and monitors the suspicious activities based the physiological parameters for example the heart rate. In such an embodiment, the wearable device may include a wrist band, a wristwatch, a wearable jacket or the like. The wearable device may be limited to a specific category or profile of the remote workers.

Moreover, the edge computing subsystem (80) further includes an alert generation module (110) to generate an alert to the processing subsystem (20) (for example: client application) upon identifying the one or more suspicious activities by the activity monitoring module (100). In addition, the processing subsystem (20) includes an access control module (120) which masks sensitive information corresponding to the one or more suspicious activities displayed on the computing device (50) upon receiving the alert generated by the alert generation module (110). In one embodiment, the streaming of information on the computing device (50) of the remote worker depends upon his role in the organisation. The access of the information displayed on the display screen of the remote worker is controlled by the access control module (120) of the edge computing subsystem (80). In such an embodiment, the access control module (120) may mask the sensitive information by suspending streaming of the sensitive information based on a learning model. In a specific embodiment, the learning model may be hosted on the peripheral edge computing device. In some embodiments, the learning model may include artificial intelligence-based learning model, a machine learning based learning model or the like. In such an embodiment, the learning model may be trained based on behaviour of the one or more remote workers and multiple data access patterns recorded by the edge assisted proctoring services corresponding to the one or more remote workers. In a specific embodiment, the learning model may be trained based on access location, access device, working time, screen time to carry out activities such as read and update sensitive information, supported activity such as customer call or related application usage when the sensitive information is present on the screen. In such an embodiment, the learning model may be configured to handle false positive and false negative cases while detecting suspicious activities. The learning model may be configured to minimize the priority of the false positive activities and maximize the priorities of the false negative activities to determine the suspicious activities more accurately. In one embodiment, the learning module may build a risk profile and help in ranking remote workers as safe. The risk profile may be pushed to the peripheral edge assisted device. In some embodiments, the learning model may prioritize privacy setting of the remote worker by masking their identity (eyes), before storing/logging (video or images) suspicious activities in the cloud server using the Blockchain.

Figure 2:
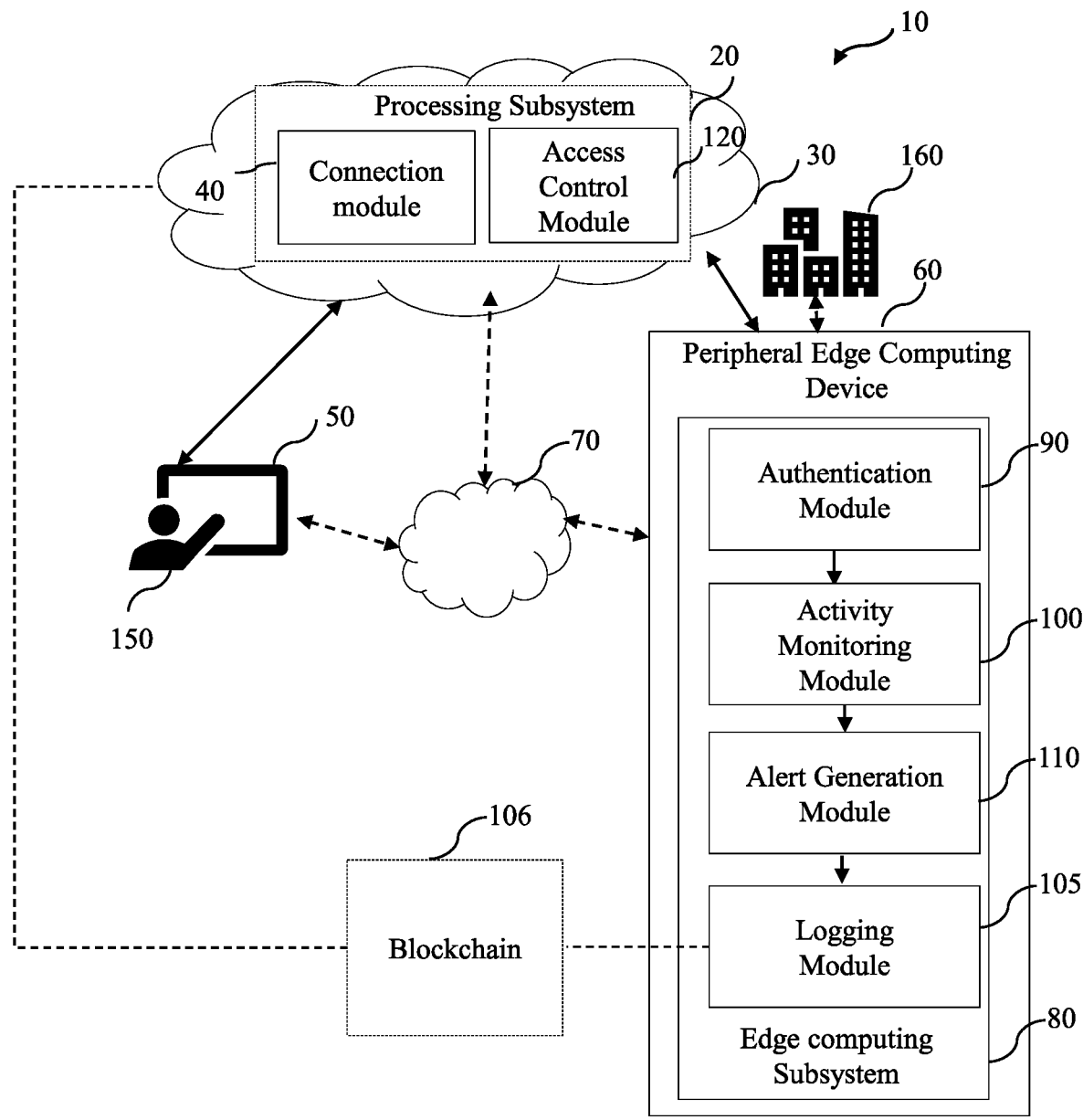
FIG. 2 is a schematic representation of an exemplary system for securing data through proctored working environment of FIG. 1 in accordance with an embodiment of the present disclosure.

FIG. 2 is a schematic representation of the system (10) for securing data of FIG. 1 in accordance with an embodiment of the present disclosure. Consider an example where an employee 'x' (150) of an organization 'y' (160) is working remotely on computing device (50) such as a laptop. The computing device (50) is enabled with an edge assisted proctoring service. The organization 'y' (160) having a peripheral edge computing device (60) is connected with the computing device (50) using a communication network (70). The system (10) includes a processing subsystem (20) hosted on a cloud server (30). The processing subsystem (20) includes a connection module (40) which checks the employee's computing device (50) for compatibility with the peripheral edge computing device (60).

Furthermore, the system (10) includes an edge computing subsystem (80) which is hosted on the peripheral edge computing device (60). The edge computing subsystem (80) includes an authentication module (90) which identifies an identity of the employee to access the computing device (50) using multiple authentication processes. In continuation with the same example, the authentication module (90) authenticates the identity of the employee 'x' (150) using the real time 3D face authentication technique. The authentication module (90) receives the image of the employee 'x' (150) using a webcam of the laptop. Further, the authentication module (90) processes the image using the 3D face authentication technique and matches the results with the prestored images in the employee database of the organization 'y' (160). Upon matching, the authentication module (90) provides the access of the information associated with the role of the employee 'x' (150) in the organization 'y' (160).

Subsequently, the edge computing subsystem (80) includes an activity monitoring module (100) which monitors various activities of the employee 'x' (100) on the laptop by streaming the activity data using the edge assisted proctoring service and the data streamed using webcam of the laptop. The activity monitoring module (100) further identifies suspicious activity among the various other activities performed by the employee 'x' (150). As an example, assuming that the employee 'x' (150) is trying to take an image of the information displayed on the screen of the computing device (50). As the webcam of the computing device (50) is capturing the real time video of the employee's activity, the activity monitoring module (100) receives the video and upon applying the image processing techniques the activity monitoring module (100) identifies various positions of employee's hand and presence of objects in hand such as camera or the like which could indicate the suspicious activity performed by the employee 'x' (150).

Upon identification of the suspicious activity, the alert generation module (110) of the edge computing subsystem (80) generates an alert on the processing subsystem (20). Once the processing subsystem (20) receives the alert of suspicious activity, the access control module (120) of the processing subsystem (20) masks the sensitive information by suspending the current session on the screen of the computing device (50). The logging module (105) record the one or more suspicious activities and store one or more recorded suspicious activities in the cloud server using Blockchain for audit and traceability purpose. of the employee 'x' (150) and generate a report having the proof of suspicious activity to track and audit the scenario with employee 'x' (150).

Figure 3:
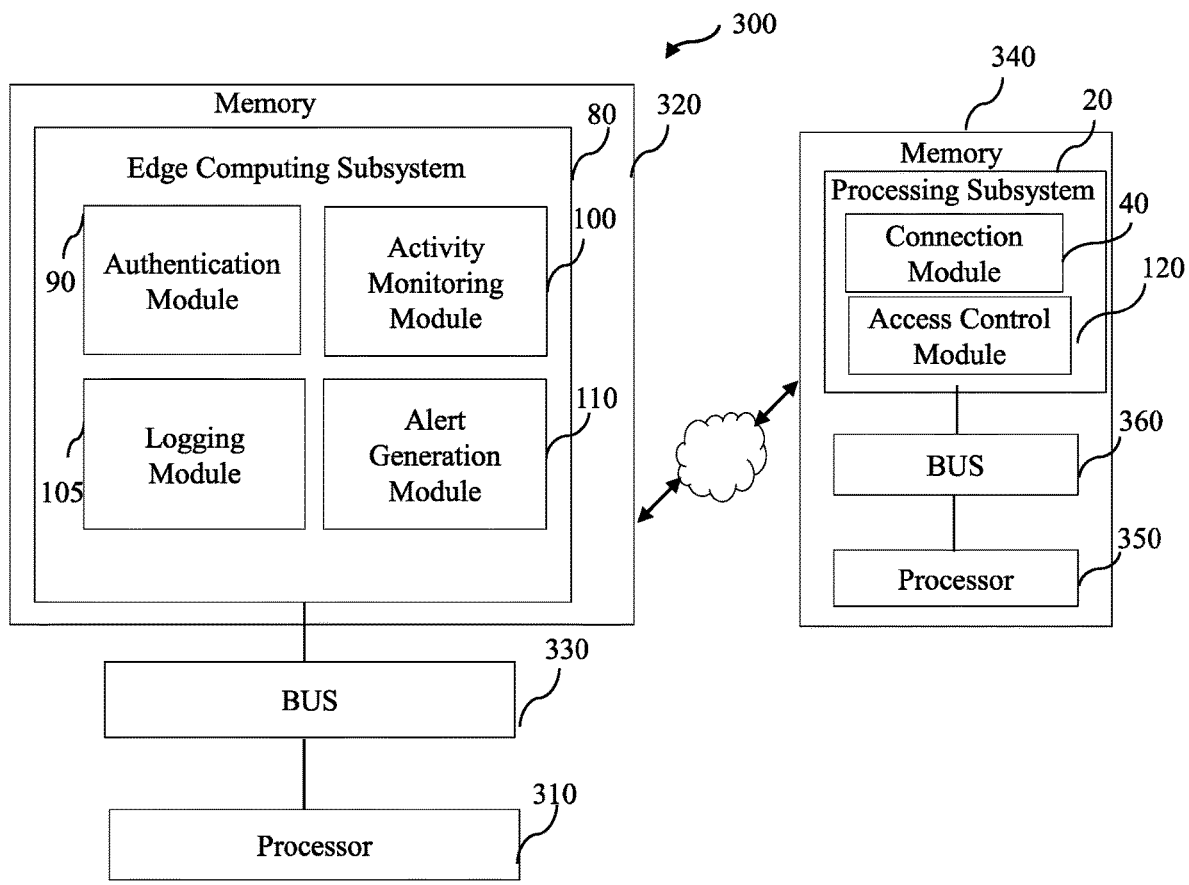
FIG. 3 is a block diagram of a computer or a server in accordance with an embodiment of the present disclosure.

FIG. 3 is a block diagram of a computer or a server (300) for system (10) for spell checking and correction in accordance with an embodiment of the present disclosure. The server includes processor(s) (310), and memory (320) operatively coupled to the bus (330).

The processor(s) (310), as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory (320) includes a plurality of subsystems stored in the form of executable program which instructs the processor (110) to perform the method steps illustrated in FIG. 1. The memory (320) is substantially similar to the server (300). The memory (320) of the server has following subsystems: a processing subsystem (20) including a connection module (40). Similarly, a memory (340) of the peripheral edge computing device (60) includes an edge computing subsystem (80) including an authentication module (90), an activity monitoring module (100), an alert generation module (110), a logging module (105) and an access control module (120) of the processing subsystem (20).

The processing subsystem (20) includes a connection module (40) configured to evaluate a computing device corresponding to one or more remote workers for compatibility with a peripheral edge computing device, where the computing device is enabled with an edge assisted proctoring service communicatively coupled to the peripheral edge computing device. The memory (340) of the peripheral edge computing device (60) includes an edge computing subsystem (80). The edge computing subsystem (80) includes an authentication module (90) configured to verify an identity of the one or more remote workers on the computing device evaluated by the connection module using a plurality of verification processes. The edge computing subsystem (80) also includes an activity monitoring module (100) configured to monitor a plurality of activities of the one or more remote workers verified by the authentication module by collecting streaming data in real-time on the peripheral edge computing device.

The activity monitoring module (100) is also configured to identify one or more suspicious activities from the plurality of activities by processing the streaming data collected on the peripheral edge computing device using one or more image processing techniques. The edge computing subsystem (80) further includes an alert generation module (110) configured to generate an alert to the processing subsystem upon identifying the one or more suspicious activities by the activity monitoring module. The edge computing subsystem further includes a logging module configured to record the one or more suspicious activities and store one or more recorded suspicious activities in the server using Blockchain for audit and traceability purpose. The processing subsystem (20) further includes an access control module (120) configured to mask sensitive information corresponding to the one or more suspicious activities displayed on the computing device upon receiving the alert generated by the alert generation module.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) (310) (350).

Figure 4:
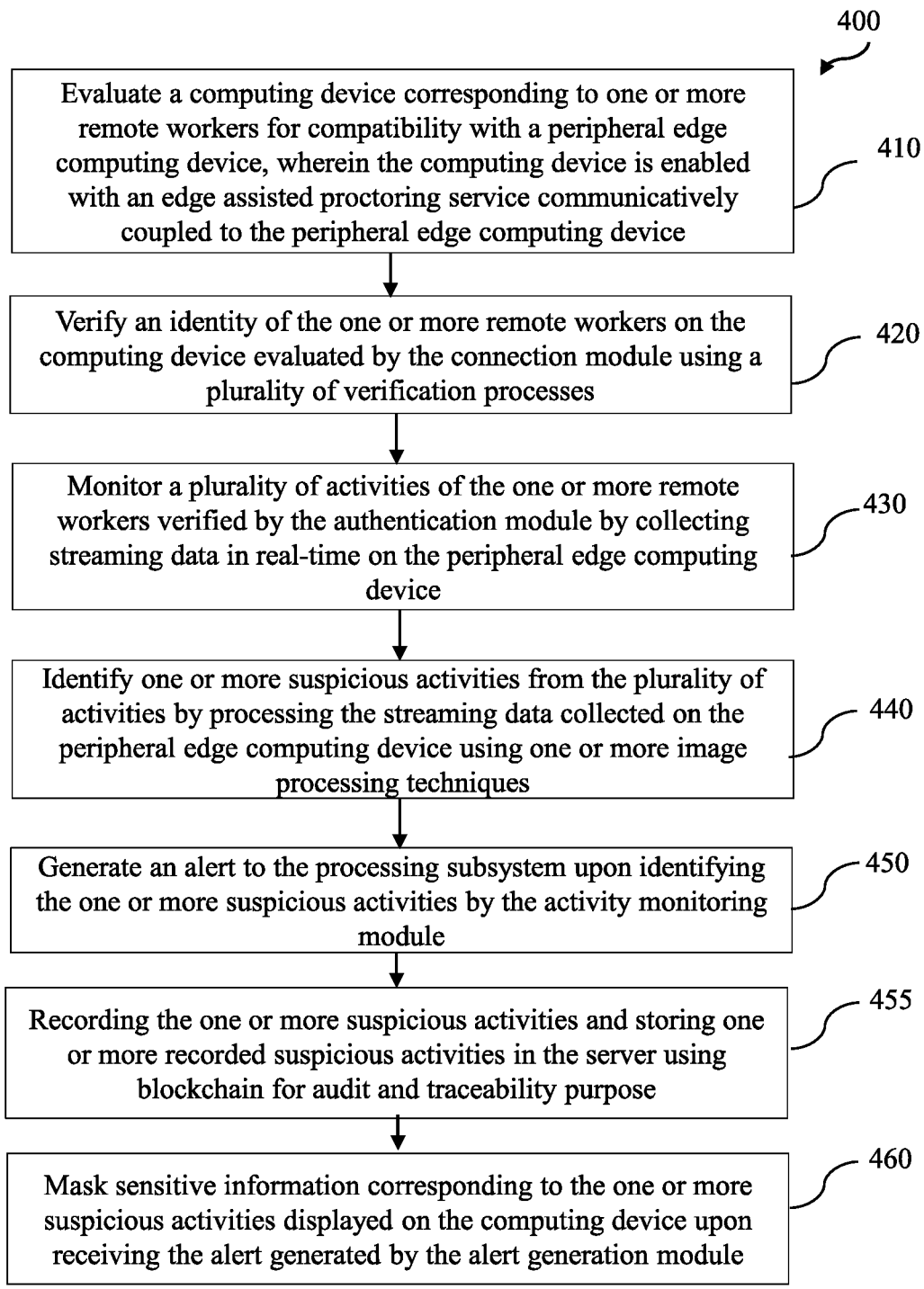
FIG. 4 is a flow chart representing the steps involved in a method for securing data through proctored working environment in accordance with an embodiment of the present disclosure.

FIG. 4 is a flow chart representing the steps involved in a method (400) for securing data through proctored working environment in accordance with an embodiment of the present disclosure. The method (400) includes evaluating a computing device corresponding to one or more remote workers for compatibility with a peripheral edge computing device, where the computing device is enabled with an edge assisted proctoring service communicatively coupled to the peripheral edge computing device in step 410. In one embodiment, evaluating a computing device corresponding to one or more remote workers for compatibility with a peripheral edge computing device by a connection module, In one embodiment, the processing subsystem of the server is communicatively coupled to the computing devices of the corresponding one or more remote workers and the peripheral edge computing device via a communication network. In such an embodiment, the communication network may include, but not limited to, wi-fi, Bluetooth, Zigbee, LAN, or the like. In one embodiment, the computing device may include, but not limited to, a computer, a laptop, a tablet, a mobile or the like.

The method (400) also includes verifying an identify of the one or more remote workers on the computing device evaluated by the connection module using multiple verification processes in step 420. In one embodiment, verifying an identify of the one or more remote workers using multiple verification processes by an authentication module of an edge computing subsystem hosted on the peripheral edge computing device. In some embodiments, peripheral edge computing device may include, but not limited to, a computer, a laptop, a tablet, a mobile or the like. In one embodiment, the multiple verification processes may include, but not limited to, at least one of a password authentication process, a face authentication process, an authorized ID authentication process, a voice authentication process, a biometric data authentication process or a combination thereof.

Furthermore, the method (400) includes monitoring various activities of the one or more remote workers verified by the authentication module by collecting streaming data in real-time on the peripheral edge computing device in step 430. In one embodiment, monitoring various activities of the one or more remote workers may include monitoring various activities of the one or more remote workers by an activity monitoring module. In one embodiment, the activity monitoring module may collect the streaming data in real-time on the peripheral edge computing device using at least one visual media present on the computing device. In such an embodiment, the streaming data may include the data proctored by the edge assisted proctoring service and the data streamed using the visual media of the computing device.

Moreover, the method (400) includes identifying one or more suspicious activities from the various activities by processing the streaming data collected on the peripheral edge computing device using one or more image processing techniques in step 440. In one embodiment, identifying one or more suspicious activities from the various activities may include identifying one or more suspicious activities from the various activities by the activity monitoring module. In a specific embodiment, the one or more suspicious activities may include, but not limited to, at least one of a multiple of faces of non-workers on a screen of the computing device, presence of any data capturing device appeared in the surroundings of the remote workers, absence of the one or more remote workers from the screen, eye movements (frequently looking away from screen), taking screenshots, keeping a note of data streaming on the screen or a combination thereof.

The method (400) further includes recording, by a logging module, the one or more suspicious activities and storing one or more recorded suspicious activities in the server using blockchain for audit and traceability purpose in step 455. In such an embodiment, monitoring and keeping a log of the streaming data to enable traceability and audit by the activity monitoring module. The log of the data may be stored in a database which is present on the server, where the log may be used to track the activities of the remote workers which may be used to take any action against the suspicious activity performed by the remote worker. The log may be stored on the server using Blockchain. In such an embodiment, the method (400) may also include generating an incident report based on the log of the streaming data when the one or more suspicious activities are identified. In a specific embodiment, the method (400) may include receiving, by the activity monitoring module, the physiological parameters obtained by the wearable device of the remote workers and monitors the suspicious activities based the physiological parameters for example the heart rate. In such an embodiment, the wearable device may include a wrist band, a wristwatch, a wearable jacket or the like. The wearable device may be limited to a specific category or profile of the remote workers.

In addition, the method (400) further includes generating an alert to the peripheral edge computing device upon identifying the one or more suspicious activities by the activity monitoring module in step 450. In one embodiment, generating an alert to the peripheral edge computing device may include generating an alert to the peripheral edge computing device by an alert generation module. The method (400) further includes masking sensitive information corresponding to the one or more suspicious activities displayed on the computing device upon receiving the alert generated by the alert generation module in step 460. In one embodiment, masking the sensitive information corresponding to the one or more suspicious activities may include masking the sensitive information corresponding to the one or more suspicious activities by an access control module. The access of the information displayed on the display screen of the remote worker is controlled by the access control module of the edge computing subsystem. In such an embodiment, the access control module may mask the sensitive information by suspending streaming of the sensitive information based on a learning model. In a specific embodiment, the learning model may be hosted on the peripheral edge computing device. In some embodiments, the learning model may include artificial intelligence-based learning model, a machine learning based learning model or the like. In such an embodiment, the learning model may be trained based on behaviour of the one or more remote workers and a plurality of data access patterns recorded by the edge assisted proctoring services corresponding to the one or more remote workers. In a specific embodiment, the learning model may be trained based on access location, access device, working time, screen time to carry out activities such as read and update sensitive information, supported activity such as customer call or related application usage when the sensitive information is present on the screen. In such an embodiment, the learning model may be configured to handle false positive and false negative cases while detecting suspicious activities. The learning model may be configured to minimize the priority of the false positive activities and maximize the priorities of the false negative activities to determine the suspicious activities more accurately. In one embodiment, the learning module may build a risk profile and help in ranking remote workers as safe. The risk profile may be pushed to the peripheral edge assisted device. In some embodiments, the learning model may prioritize privacy setting of the remote worker by masking their identity (eyes), before storing/logging (video or images) suspicious activities in the cloud server using the Blockchain.

Various embodiments of the system and method for securing data through proctored working environment as described above enables the system to conserve bandwidth, storage and reduce costs of maintaining on-premises infrastructure. Also, the end use experience may be enhanced with hyper personalisation of digital workspace. The system enables a security option where maintaining complete privacy of the employees, the system may mask the sensitive information by suspending the session if the system determined that the remote worker is deviating from the normal behaviour model.

In addition, the system automates the verification, information delivery, proctoring and validation processes. The system eliminates the need for on-site personnel to support the system and continuous and dedicated network connection to provide a secure and private proctoring environment. The system makes computerized proctoring much more readily available to the potential organisations. The system also allows to the organisations to administer secure, verified proctoring with a minimum of overhead and other expenses.

It will be understood by those skilled in the art that the general description and the detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A computer-implemented system for securing data through proctoring working environment comprising:
    a processor; and
    a memory coupled to the processor, wherein the memory comprises a set of program instructions in the form of a plurality of subsystems, configured to be executed by the processor, wherein the plurality of subsystems comprises:
    a processing subsystem hosted on a server, wherein the processing subsystem comprises:
    a connection module configured to evaluate a computing device corresponding to one or more remote workers for compatibility with a peripheral edge computing device, wherein the computing device is enabled with an edge assisted proctoring service communicatively coupled to the peripheral edge computing device;
    an edge computing subsystem hosted on the peripheral edge computing device wherein the edge computing subsystem comprises:
    an authentication module configured to verify an identity of the one or more remote workers on the computing device evaluated by the connection module using a plurality of verification processes;
    an activity monitoring module configured to:
    monitor a plurality of activities of the one or more remote workers verified by the authentication module by collecting streaming data in real-time on the peripheral edge computing device; and
    identify one or more suspicious activities from the plurality of activities by processing the streaming data collected on the peripheral edge computing device using one or more image processing techniques;
    an alert generation module configured to generate an alert to the processing subsystem upon identifying the one or more suspicious activities by the activity monitoring module;
    a logging module configured to record the one or more suspicious activities and store one or more recorded suspicious activities in the server using Blockchain for audit and traceability purpose,
    wherein the processing subsystem comprises an access control module configured to mask sensitive information corresponding to the one or more suspicious activities displayed on the computing device upon receiving the alert generated by the alert generation module.

2. The computer-implemented system as claimed in claim 1, wherein the plurality of verification processes comprises at least one of a password authentication process, a face authentication process, an authorized ID authentication process, a voice authentication process, and a biometric data authentication process.

3. The computer-implemented system as claimed in claim 2, wherein the face authentication process comprises a real time three-dimensional face identification of the one or more remote workers.

4. The computer-implemented system as claimed in claim 2, wherein the biometric data authentication process comprises obtaining one or more physiological parameters using a wearable device coupled to the one or more remote workers.

5. The computer-implemented system as claimed in claim 1, wherein the activity monitoring module is configured to collect the streaming data in real-time on the peripheral edge computing device using at least one visual media present on the computing device.

6. The computer-implemented system as claimed in claim 1, wherein the one or more suspicious activities comprises at least one of a plurality of faces of non-workers on a screen of the computing device, presence of a data capturing device, absence of the one or more remote workers from the screen, taking screenshots, and keeping a note of data streaming on the screen.

7. The computer-implemented system as claimed in claim 1, wherein the activity monitoring module is configured to generate an incident report based on the one or more recorded suspicious activities.

8. The computer-implemented system as claimed in claim 1, wherein the access control module is configured to mask the sensitive information by suspending streaming of the sensitive information based on a learning model.

9. The computer-implemented system as claimed in claim 8, wherein the learning model is trained based on behaviour of the one or more remote workers and a plurality of data access patterns corresponding to the one or more remote workers, and is hosted on the peripheral edge computing device.

10. A computer-implemented method for securing data through proctoring working environment comprising:
- evaluating, by a connection module, a computing device corresponding to one or more remote workers for compatibility with a peripheral edge computing device, wherein the computing device is enabled with an edge assisted proctoring service communicatively coupled to the peripheral edge computing device;
- verifying, by an authentication module, an identity of the one or more remote workers on the computing device evaluated by the connection module using a plurality of verification processes;
- monitoring, by an activity monitoring module, a plurality of activities of the one or more remote workers verified by the authentication module by collecting streaming data in real-time on the peripheral edge computing device;
- identifying, by the activity monitoring module, one or more suspicious activities from the plurality of activities by processing the streaming data collected on the peripheral edge computing device using one or more image processing techniques;
- generating, by an alert generation module, an alert to the processing subsystem upon identifying the one or more suspicious activities by the activity monitoring module;
- recording, by a logging module, the one or more suspicious activities and storing one or more recorded suspicious activities in the server using blockchain for audit and traceability purpose; and
- masking, by the access control module, sensitive information corresponding to the one or more suspicious activities displayed on the computing device upon receiving the alert generated by the alert generation module.

* * * * *